(12) United States Patent
Itakura et al.

(10) Patent No.: US 11,996,904 B2
(45) Date of Patent: May 28, 2024

(54) BUS SYSTEM AND COMMUNICATION APPARATUS

(71) Applicant: MITSUBISHI ELECTRIC CORPORATION, Tokyo (JP)

(72) Inventors: Hiroshi Itakura, Tokyo (JP); Yoshihiro Akeboshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 945 days.

(21) Appl. No.: 16/968,783

(22) PCT Filed: Feb. 15, 2018

(86) PCT No.: PCT/JP2018/005270
§ 371 (c)(1),
(2) Date: Aug. 10, 2020

(87) PCT Pub. No.: WO2019/159285
PCT Pub. Date: Aug. 22, 2019

(65) Prior Publication Data
US 2020/0403654 A1  Dec. 24, 2020

(51) Int. Cl.
*H04B 3/30* (2006.01)
(52) U.S. Cl.
CPC ..................... *H04B 3/30* (2013.01)
(58) Field of Classification Search
None
See application file for complete search history.

(56) References Cited

U.S. PATENT DOCUMENTS

| | | | | |
|---|---|---|---|---|
| 5,661,416 A * | 8/1997 | Takada | ............. | H03K 19/09429 326/86 |
| 5,955,889 A | 9/1999 | Taguchi et al. | | |
| 5,982,192 A * | 11/1999 | Saito | ................... | G06F 13/4086 326/82 |
| 7,898,289 B2 * | 3/2011 | Oono | ................... | G06F 13/4086 326/32 |
| 8,508,252 B2 * | 8/2013 | Farjadrad | ............. | H04L 25/028 326/30 |

FOREIGN PATENT DOCUMENTS

| | | |
|---|---|---|
| JP | 7-321828 A | 12/1995 |
| JP | 2009-146246 A | 7/2009 |
| JP | 2014-106699 A | 6/2014 |

* cited by examiner

*Primary Examiner* — Kenneth B Wells
(74) *Attorney, Agent, or Firm* — Birch, Stewart, Kolasch & Birch, LLP

(57) ABSTRACT

A signal compensation line includes at least one of: a first signal compensation line including a first end connected to a main line (3) on a side closer to a first communication device (1) with respect to a first connection point (8-1) counted from the first communication device (1) among connection points (8-1) to (8-3) between the main line (3) and respective first ends of branch lines (5-1) to (5-3), and a second end grounded; or a second signal compensation line including a first end connected to the main line (3) on a side closer to a second communication device (2) with respect to the first connection point (8-3) counted from the second communication device (2) among the respective connection points (8-1) to (8-3), and a second end grounded.

5 Claims, 6 Drawing Sheets

BUS SYSTEM AND COMMUNICATION APPARATUS

TECHNICAL FIELD

The present invention relates to a bus system including a main line and a plurality of branch lines, and a communication apparatus including the bus system.

BACKGROUND ART

Patent Literature 1 below discloses a bus system including a main wiring line whose both ends are terminated, and a plurality of branch lines whose first end is connected to the main wiring line and second end is connected to each transmitting and receiving device.

In the bus system disclosed in Patent Literature 1, measures have been taken to suppress an influence on a signal transmitted and received by the transmitting and receiving device, by a reflected wave generated at each position at which each of the plurality of branch lines and the main wiring line are connected to each other (hereinafter, referred to as a "branch signal").

The measures to suppress the influence of the reflected wave on the branch signal are as follows.
 (1) The characteristic impedance of the main wiring line is set to be the lowest at the center and set higher as it is closer to both ends.
 (2) The characteristic impedance of the main wiring line is set so that the characteristic impedance from the center to a first end of the main wiring line and the characteristic impedance from the center to a second end of the main wiring line are symmetrical.
 (3) The input impedance of the transmitting and receiving device in the receiving state is set higher than the characteristic impedance of the main wiring line on the first end side from a connection position if the connection position between the branch line to which the transmitting and receiving device is connected and the main wiring line is on the first end side from the center of the main wiring line.

In addition, the input impedance of the transmitting and receiving device in the receiving state is set higher than the characteristic impedance of the main wiring line on the second end side from a connection position if the connection position between the branch line to which the transmitting and receiving device is connected and the main wiring line is on the second end side from the center of the main wiring line.

CITATION LIST

Patent Literatures

Patent Literature 1: JP 2014-106699 A

SUMMARY OF INVENTION

Technical Problem

In the conventional bus system, if the characteristic impedance of the main wiring line and the input impedance of the transmitting and receiving device in the receiving state are set just as the measures described above, the influence of the reflected wave on the branch signal can be suppressed.

However, since a substrate on which the bus system is provided has manufacturing restrictions, there is a case where the characteristic impedance of the main wiring line is not the characteristic impedance as a measure.

In the conventional bus system, there has been a problem that when the characteristic impedance as the measure cannot be implemented as the characteristic impedance of the main wiring line, the influence of the reflected wave on the branch signal cannot be suppressed.

The present invention has been made to solve the above problem, and has an object to obtain a bus system enabled to reduce the influence of the reflected wave on the branch signal.

The present invention also has an object to obtain a communication apparatus including the bus system enabled to reduce the influence of the reflected wave on the branch signal.

Solution to Problem

A bus system according to the present invention includes: a main line including a first end connected to a first communication device, and a second end connected to a second communication device; a plurality of branch lines each including a first end connected to the main line, and a second end connected to any one of a plurality of third communication devices; and a signal compensation line including a first end connected to the main line, and a second end grounded, in which the signal compensation line includes at least one of: a first signal compensation line including a first end connected to the main line on a side closer to the first communication device with respect to a first connection point counted from the first communication device among connection points between the main line and respective first ends of the plurality of branch lines, and a second end grounded; or a second signal compensation line including a first end connected to the main line on a side closer to the second communication device with respect to a first connection point counted from the second communication device among the respective connection points, and a second end grounded.

Advantageous Effects of Invention

According to the present invention, the bus system includes the signal compensation line includes at least one of: the first signal compensation line including the first end connected to the main line on the side of the first communication device from the first connection point counted from the first communication device among the connection points between the main line and the respective first ends of the plurality of branch lines, and the second end grounded; or the second signal compensation line including the first end connected to the main line on the side of the second communication device from the first connection point counted from the second communication device among the respective connection points, and the second end grounded. Thus, the bus system according to the present invention can reduce the influence of the reflected wave on the branch signal.

DESCRIPTION OF EMBODIMENTS

Hereinafter, to explain the present invention in more detail, embodiments for carrying out the present invention will be described with reference to the accompanying drawings.

First Embodiment

Figure 1:
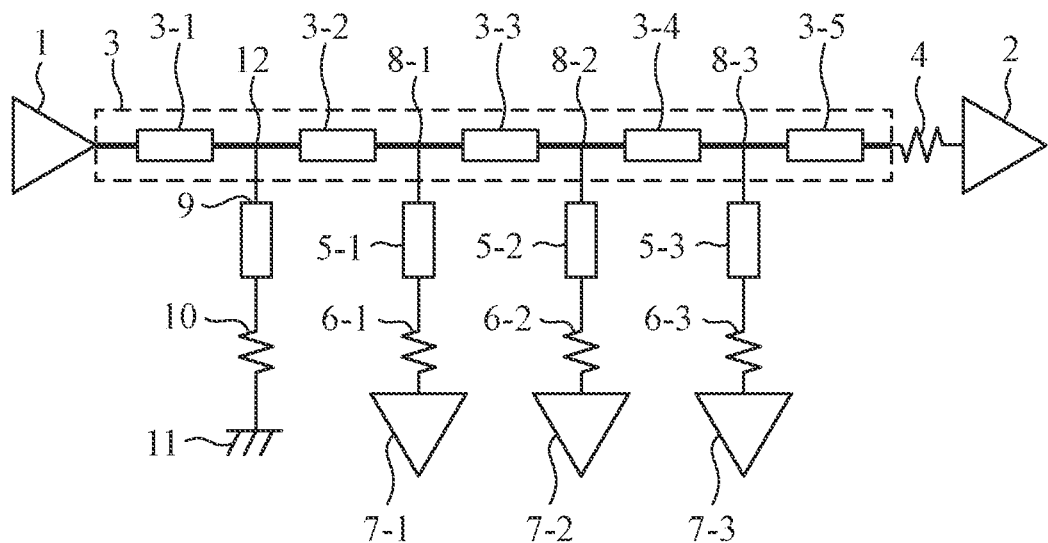
FIG. 1 is a configuration diagram illustrating a bus system according to a first embodiment.

FIG. 1 is a configuration diagram illustrating a bus system according to a first embodiment.

The bus system illustrated in FIG. 1 includes a first communication device 1, a second communication device 2, a main line 3, a terminating resistor 4, branch lines 5-1 to 5-3, terminating resistors 6-1 to 6-3, third communication devices 7-1 to 7-3, a signal compensation line 9, a terminating resistor 10, and a ground 11.

However, the first communication device 1, the second communication device 2, and the third communication devices 7-1 to 7-3 may be provided outside the bus system.

In FIG. 1, the first communication device 1 is a transmitter connected to a first end of the main line 3.

The second communication device 2 is a receiver connected to a second end of the main line 3 via the terminating resistor 4.

The main line 3 includes the first end connected to the first communication device 1 and the second end connected to the second communication device 2 via the terminating resistor 4.

The main line 3 includes a partial line 3-1, a partial line 3-2, a partial line 3-3, a partial line 3-4, and a partial line 3-5.

The partial line 3-1 is a part of the main line 3, including a first end connected to the first communication device 1 and a second end connected to a first end of the partial line 3-2.

The partial line 3-2 is a part of the main line 3, including the first end connected to the second end of the partial line 3-1 and a second end connected to a first end of the partial line 3-3.

The partial line 3-3 is a part of the main line 3, including the first end connected to the second end of the partial line 3-2 and a second end connected to a first end of the partial line 3-4.

The partial line 3-4 is a part of the main line 3, including the first end connected to the second end of the partial line 3-3 and a second end connected to a first end of the partial line 3-5.

The partial line 3-5 is a part of the main line 3, including the first end connected to the second end of the partial line 3-4 and a second end connected to a first end of the terminating resistor 4.

For convenience of explanation, FIG. 1 illustrates the main line 3 including the partial line 3-1, the partial line 3-2, the partial line 3-3, the partial line 3-4, and the partial line 3-5 connected together in series; however, the main line 3 is actually a single line.

In the bus system illustrated in FIG. 1, the line length of the partial line 3-2 and the line length of the partial line 3-3 are the same length.

The terminating resistor 4 is a resistor including the first end connected to the second end of the partial line 3-5 and a second end connected to the second communication device 2.

The terminating resistor 4 is matched with the second communication device 2.

Since the terminating resistor 4 is matched with the second communication device 2, it is possible to suppress reflection of a signal reaching the second communication device 2 through the main line 3.

The branch line 5-$n$ ($n$=1, 2, 3) includes a first end connected to the main line 3, and a second end connected to the third communication device 7-$n$ via the terminating resistor 6-$n$.

The terminating resistor 6-$n$ is a resistor connected between the second end of the branch line 5-$n$ and the third communication device 7-$n$.

The terminating resistor 6-$n$ is matched with the third communication device 7-$n$.

Since the terminating resistor 6-$n$ is matched with the third communication device 7-$n$, it is possible to suppress reflection of a signal reaching the third communication device 7-$n$ through the branch line 5-$n$.

The third communication device 7-$n$ is a receiver connected to the second end of the branch line 5-$n$ via the terminating resistor 6-$n$.

A connection point 8-$n$ is a point where the first end of the branch line 5-$n$ is connected to the main line 3.

The signal compensation line 9 is a first signal compensation line including a first end connected to the main line 3 on a side closer to the first communication device 1 with respect to the connection point 8-1 in the main line 3, and a second end grounded via the terminating resistor 10.

The terminating resistor 10 is a resistor connected between the second end of the signal compensation line 9 and the ground 11.

The terminating resistor 10 is matched with the signal compensation line 9.

Since the terminating resistor 10 is matched with the signal compensation line 9, it is possible to suppress reflection of a signal reaching the ground 11 through the signal compensation line 9.

A connection point 12 is a point where the first end of the signal compensation line 9 is connected to the main line 3.

The bus system illustrated in FIG. 1 is an example in which the first communication device 1 is a transmitter, and each of the second communication device 2 and the third communication device 7-$n$ is a receiver. However, the bus system is not limited to this, and for example, the first communication device 1 may be a receiver, and each of the second communication device 2 and the third communication device 7-$n$ may be a transmitter.

In the bus system illustrated in FIG. 1, it is assumed that the characteristic impedances of the partial lines 3-1 to 3-5, the branch lines 5-1 to 5-3, and the signal compensation line 9 are, for example, unified to son.

Although the bus system illustrated in FIG. 1 illustrates an example in which the number of branch lines 5-$n$ is three, this is not a limitation. For example, the number of branch lines 5-*n* may be two, or may be four or more.

Next, operation of the bus system illustrated in FIG. 1 will be described.

Figure 2:
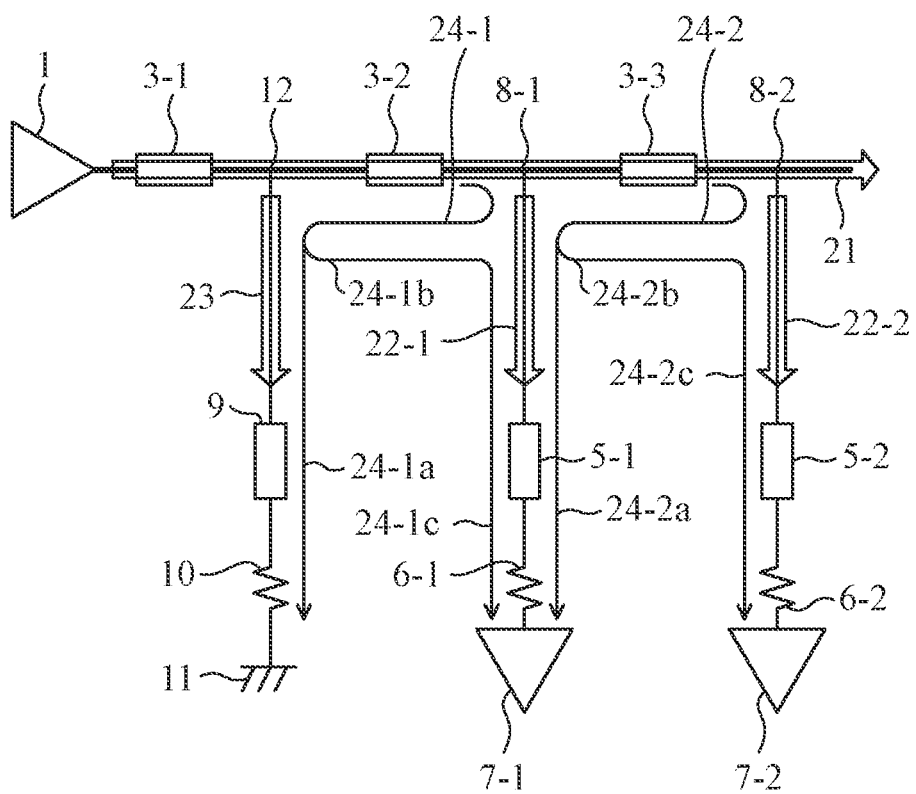
FIG. 2 is an explanatory diagram illustrating a flow of a signal output from a first communication device 1.

FIG. 2 is an explanatory diagram illustrating a flow of a signal output from the first communication device 1.

The signal output from the first communication device 1 (hereinafter, referred to as a "main signal 21".) is transmitted to the second communication device 2 by the main line 3. As the main signal 21, in addition to a pulse signal, a multi-level signal or the like is applicable.

Since the branch lines 5-1 to 5-3 and the signal compensation line 9 are connected to the main line 3, the main signal 21 output from the first communication device 1 is divided. A divided signal (hereinafter, referred to as a "branch signal") flows through each of the branch lines 5-1 to 5-3 and the signal compensation line 9.

In FIG. 2, the branch signal flowing through the branch line 5-1 is represented by reference numeral 22-1, and the branch signal flowing through the branch line 5-2 is represented by reference numeral 22-2.

In addition, the branch signal flowing through the signal compensation line 9 is represented by reference numeral 23.

The branch signal 22-1 reaches the third communication device 7-1 through the branch line 5-1, and is received by the third communication device 7-1.

The branch signal 22-2 reaches the third communication device 7-2 through the branch line 5-2, and is received by the third communication device 7-2.

At each of the connection points 8-1 to 8-3, branching is made into two lines having the same characteristic impedance, and a mismatch occurs resulting in a negative reflection coefficient at which the characteristic impedance is reduced, so that a part of the main signal 21 is reflected at each of the connection points 8-1 to 8-3.

For example, a reflected signal 24-1, which is a signal reflected at the connection point 8-1, flows through the partial line 3-2 as illustrated in FIG. 2.

When reaching the connection point 12 between the main line 3 and the signal compensation line 9, the reflected signal 24-1 is reflected at the connection point 12.

A part of the reflected signal 24-1 flows through the signal compensation line 9 as a reflected signal 24-1*a* as illustrated in FIG. 2.

The rest of the reflected signal 24-1 flows through the partial line 3-2 as a reflected signal 24-1*b*.

When reaching the connection point 8-1, the reflected signal 24-1*b* is reflected at the connection point 8-1.

A part of the reflected signal 24-1*b* flows through the branch line 5-1 as a reflected signal 24-1*c* as illustrated in FIG. 2.

A reflected signal 24-2, which is a signal reflected at the connection point 8-2, flows through the partial line 3-3 as illustrated in FIG. 2.

When reaching the connection point 8-1, the reflected signal 24-2 is reflected at the connection point 8-1.

A part of the reflected signal 24-2 flows through the branch line 5-1 as a reflected signal 24-2*a* as illustrated in FIG. 2.

The rest of the reflected signal 24-2 flows through the partial line 3-3 as a reflected signal 24-2*b*.

When reaching the connection point 8-2, the reflected signal 24-2*b* is reflected at the connection point 8-2.

A part of the reflected signal 24-2*b* flows through the branch line 5-2 as a reflected signal 24-2*c* as illustrated in FIG. 2.

In the bus system illustrated in FIG. 1, if the signal compensation line 9 is not connected to the main line 3, the reflected signal 24-1*c* does not flow through the branch line 5-1.

Thus, in this case, signals flowing through the branch line 5-1 are the branch signal 22-1 and the reflected signal 24-2*a*.

The reflected signal 24-2*a* is delayed from the branch signal 22-1 by the amount of time for flowing through the partial line 3-3 twice. Original signals of the reflected signal 24-2*a* are the main signal 21 and the reflected signal 24-2, and the main signal 21 flows through the partial line 3-3 once, and the reflected signal 24-2 flows through the partial line 3-3 once. Thus, the reflected signal 24-2*a* flows through the partial line 3-3 twice.

In addition, the reflected signal 24-2*a* is a signal having an opposite polarity from the main signal 21 due to the reflection of the original signal at the connection point 8-2, so that the reflected signal 24-2*a* is a signal having an opposite polarity from the branch signal 22-1. Thus, if the branch signal 22-1 is a signal having a plus sign, the reflected signal 24-2*a* is a signal having a minus sign, and if the branch signal 22-1 is a signal having the minus sign, the reflected signal 24-2*a* is a signal having the plus sign.

Since the reflected signal 24-2*a* is delayed from the branch signal 22-1, and is a signal having an opposite polarity from the branch signal 22-1, the reflected signal 24-2*a* is a factor of causing a waveform distortion or a waveform breaking of the branch signal 22-1.

In the bus system illustrated in FIG. 1, since the signal compensation line 9 is connected to the main line 3, the reflected signal 24-1*c* flows through the branch line 5-1.

The reflected signal 24-1*c* is delayed from the branch signal 22-1 by the amount of time for flowing through the partial line 3-2 twice. Original signals of the reflected signal 24-1*c* are the reflected signal 24-1 and the reflected signal 24-1*b*, and the reflected signal 24-1 flows through the partial line 3-2 once, and the reflected signal 24-1*b* flows through the partial line 3-2 once. Thus, the reflected signal 24-1*c* flows through the partial line 3-2 twice.

However, since the line length of the partial line 3-2 is the same as the line length of the partial line 3-3, the amount of delay of the reflected signal 24-1*c* with respect to the branch signal 22-1 is the same as the amount of delay of the reflected signal 24-2*a* with respect to the branch signal 22-1.

In addition, the reflected signal 24-1*c* is a signal having an opposite polarity from the main signal 21 due to the reflection of the original signal at the connection point 8-1, but the original signal is also reflected at the connection point 12 thereafter, so that the reflected signal 24-1*c* is a signal having the same polarity as the main signal 21.

Thus, the reflected signal 24-1*c* is a signal having the same polarity as the branch signal 22-1, and is a signal having an opposite polarity from the reflected signal 24-2*a*.

Since the reflected signal 24-1*c* and the reflected signal 24-2*a* are signals having opposite polarities from each other, the signals cancel each other out, and a signal reaching the third communication device 7-1 is substantially only the branch signal 22-1.

As described above, in the bus system illustrated in FIG. 1, the influence of the reflected signal 24-2*a* on the branch signal 22-1 is reduced.

Here, the bus system is illustrated in which the line length of the partial line 3-2 and the line length of the partial line 3-3 are the same length.

The bus system is not limited to this, and for example, the line length of the partial line 3-2, the line length of the partial line 3-3, and the line length of the partial line 3-4 may be the same length.

If the line length of the partial line 3-2, the line length of the partial line 3-3, and the line length of the partial line 3-4 are the same length, a signal reaching the third communication device 7-2 is also substantially only the branch signal 22-2.

In the first embodiment described above, the bus system includes the signal compensation line 9 including the first end connected to the main line 3 on a side closer to the first communication device 1 with respect to the first connection point 8-1 counted from the first communication device 1 among the connection points 8-1 to 8-3 between the main line 3 and respective first ends of the branch lines 5-1 to 5-3, and the second end grounded. Thus, the bus system can reduce the influence of the reflected wave on the branch signal.

Second Embodiment

The bus system of the first embodiment is an example in which the second end of the main line 3 is connected to the second communication device 2 via the terminating resistor 4.

A bus system in which the second end of the main line 3 is grounded via a terminating resistor 13, will be described in a second embodiment.

Figure 3:
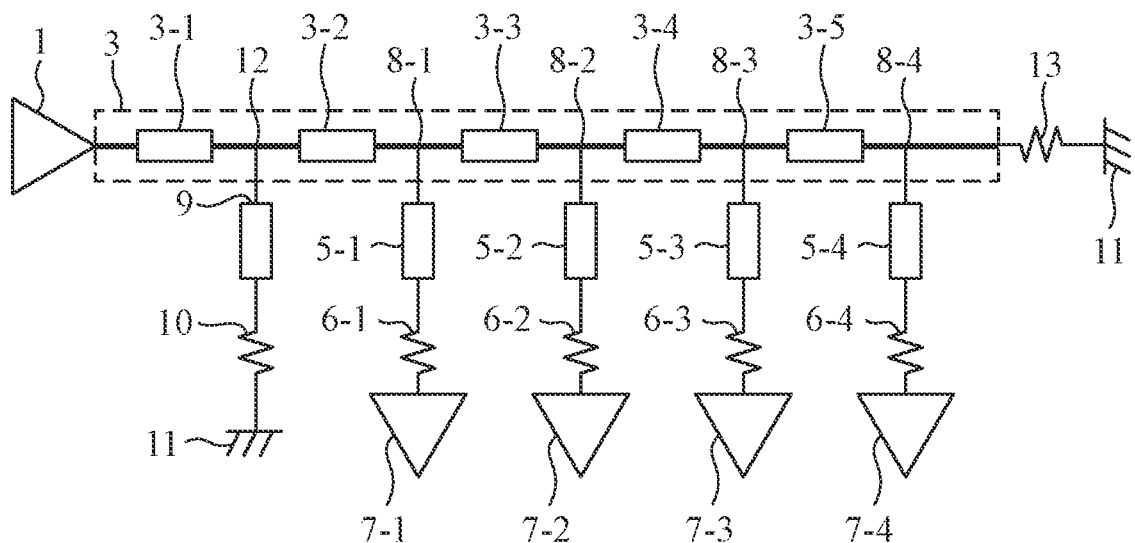
FIG. 3 is a configuration diagram illustrating a bus system according to a second embodiment.

FIG. 3 is a configuration diagram illustrating the bus system according to the second embodiment. In FIG. 3, since the same reference numerals as those in FIG. 1 denote the same or corresponding portions, the description thereof will be omitted.

A branch line 5-4 includes a first end connected to the main line 3, and a second end connected to a third communication device 7-4 via a terminating resistor 6-4.

The terminating resistor 6-4 is a resistor connected between the second end of the branch line 5-4 and the third communication device 7-4.

The terminating resistor 6-4 is matched with the third communication device 7-4.

Since the terminating resistor 6-4 is matched with the third communication device 7-4, it is possible to suppress reflection of a signal reaching the third communication device 7-4 through the branch line 5-4.

The third communication device 7-4 is a receiver connected to the second end of the branch line 5-4 via the terminating resistor 6-4.

A connection point 8-4 is a point where the first end of the branch line 5-4 is connected to the main line 3.

The terminating resistor 13 includes a first end connected to the second end of the main line 3, and a second end connected to the ground 11.

The bus system illustrated in FIG. 3 is different from the bus system illustrated in FIG. 1 in that the second end of the main line 3 is grounded via the terminating resistor 13.

However, similarly to the bus system illustrated in FIG. 1, the bus system illustrated in FIG. 3 includes the signal compensation line 9 including the first end connected to the main line 3 on a side closer to the first communication device 1 with respect to the connection point 8-1 in the main line 3, and the second end grounded.

Thus, in the bus system illustrated in FIG. 3, the signal reaching the third communication device 7-1 is substantially only a branch signal passing through the branch line 5-1 in accordance with the same principle as that of the bus system illustrated in FIG. 1.

If all of the line lengths of the partial lines 3-2 to 3-5 are the same length, also the signal reaching the third communication device 7-2 is substantially only a branch signal passing through the branch line 5-2. In addition, also a signal reaching the third communication device 7-3 is substantially only a branch signal passing through the branch line 5-3.

Third Embodiment

The bus systems of the first and second embodiments include the signal compensation line 9 including the first end connected to the main line 3 on a side closer to the first communication device 1 with respect to the connection point 8-1 in the main line 3.

In a third embodiment, a bus system will be described including a signal compensation line 14 including a first end connected to the main line 3 on a side closer to the terminating resistor 13 with respect to the connection point 8-4 in the main line 3.

Figure 4:
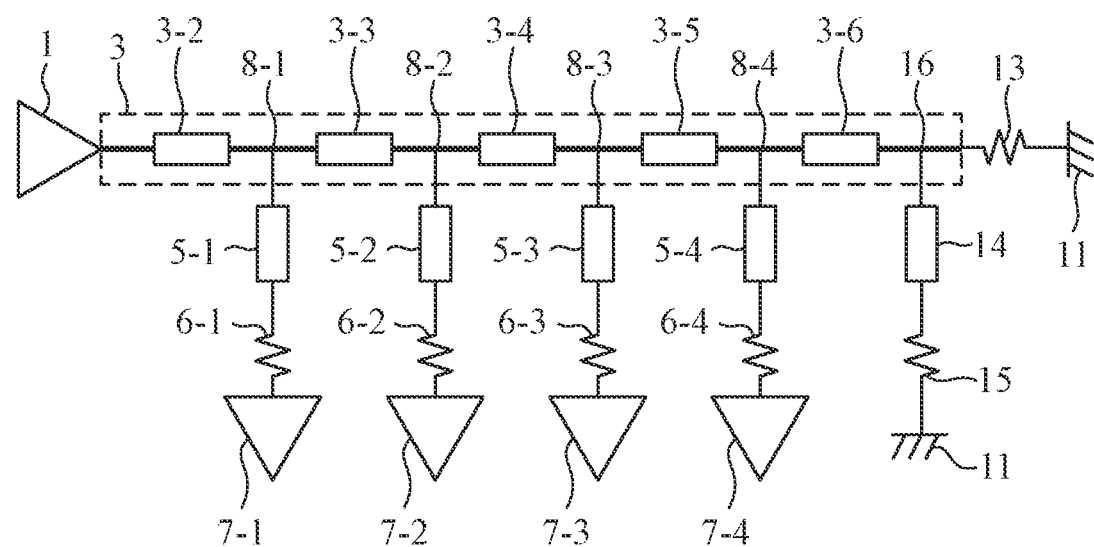
FIG. 4 is a configuration diagram illustrating a bus system according to a third embodiment.

FIG. 4 is a configuration diagram illustrating the bus system according to the third embodiment. In FIG. 4, since the same reference numerals as those in FIGS. 1 and 3 denote the same or corresponding portions, the description thereof will be omitted.

Although the bus system illustrated in FIG. 4 illustrates an example in which the second end of the main line 3 is grounded via the terminating resistor 13, a bus system may be used in which the second end of the main line 3 is connected to the second communication device 2 via the terminating resistor 4.

The main line 3 includes the partial line 3-2, the partial line 3-3, the partial line 3-4, the partial line 3-5, and a partial line 3-6.

The partial line 3-6 is a part of the main line 3, including a first end connected to the second end of the partial line 3-5 and a second end connected to the first end of the terminating resistor 13.

For convenience of explanation, FIG. 4 illustrates the main line 3 including the partial line 3-2, the partial line 3-3, the partial line 3-4, the partial line 3-5, and the partial line 3-6 connected together in series; however, the main line 3 is actually a single line.

In the bus system illustrated in FIG. 4, the line length of the partial line 3-5 and the line length of the partial line 3-6 are the same length.

The signal compensation line 14 is a second signal compensation line including a first end connected to the main line 3 on a side closer to the terminating resistor 13 with respect to the connection point 8-4 in the main line 3, and a second end grounded via a terminating resistor 15.

The terminating resistor 15 is a resistor connected between the second end of the signal compensation line 14 and the ground 11.

The terminating resistor 15 is matched with the signal compensation line 14.

Since the terminating resistor 15 is matched with the signal compensation line 14, it is possible to suppress reflection of a signal reaching the ground 11 through the signal compensation line 14.

A connection point 16 is a point where the first end of the signal compensation line 14 is connected to the main line 3.

Next, operation of the bus system illustrated in FIG. 4 will be described.

Figure 5:
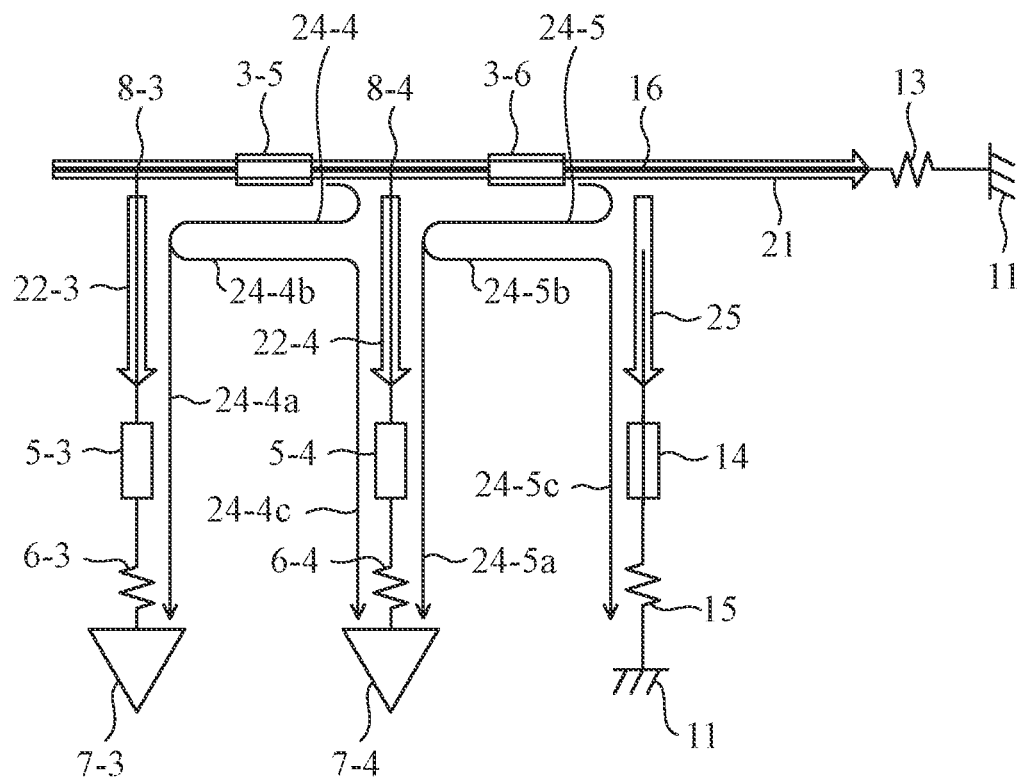
FIG. 5 is an explanatory diagram illustrating a flow of a signal output from the first communication device 1.

FIG. 5 is an explanatory diagram illustrating a flow of the signal output from the first communication device 1.

The main signal 21 output from the first communication device 1 is transmitted by the main line 3.

Since the branch lines 5-1 to 5-4 and the signal compensation line 14 are connected to the main line 3, the main signal 21 output from the first communication device 1 is divided. Branch signals, which are divided signals, flow through the respective branch lines 5-1 to 5-4 and signal compensation line 14.

In FIG. 5, the branch signal flowing through the branch line 5-3 is represented by reference numeral 22-3, and the branch signal flowing through the branch line 5-4 is represented by reference numeral 22-4.

In addition, the branch signal flowing through the signal compensation line 14 is represented by reference numeral 25.

The branch signal 22-3 reaches the third communication device 7-3 through the branch line 5-3, and is received by the third communication device 7-3.

The branch signal 22-4 reaches the third communication device 7-4 through the branch line 5-4, and is received by the third communication device 7-4.

Since a mismatch of the characteristic impedance of the line occurs at each of the connection points 8-1 to 8-4, a part of the main signal 21 is reflected at each of the connection points 8-1 to 8-4.

For example, a reflected signal 24-4, which is a signal reflected at the connection point 8-4, flows through the partial line 3-5 as illustrated in FIG. 5.

When reaching the connection point 8-3, the reflected signal 24-4 is reflected at the connection point 8-3.

A part of the reflected signal 24-4 flows through the branch line 5-3 as a reflected signal 24-4a as illustrated in FIG. 5.

The rest of the reflected signal 24-4 flows through the partial line 3-5 as a reflected signal 24-4b.

When reaching the connection point 8-4, the reflected signal 24-4b is reflected at the connection point 8-4.

A part of the reflected signal 24-4b flows through the branch line 5-4 as a reflected signal 24-4c as illustrated in FIG. 5.

A reflected signal 24-5, which is a signal reflected at the connection point 16, flows through the partial line 3-6 as illustrated in FIG. 5.

When reaching the connection point 8-4, the reflected signal 24-5 is reflected at the connection point 8-4.

A part of the reflected signal 24-5 flows through the branch line 5-4 as a reflected signal 24-5a as illustrated in FIG. 5.

The rest of the reflected signal 24-5 flows through the partial line 3-6 as a reflected signal 24-5b.

When reaching the connection point 16, the reflected signal 24-5b is reflected at the connection point 16.

A part of the reflected signal 24-5b flows through the signal compensation line 14 as a reflected signal 24-5c as illustrated in FIG. 5.

In the bus system illustrated in FIG. 4, if the signal compensation line 14 is not connected to the main line 3, the reflected signal 24-5a does not flow through the branch line 5-4.

Thus, in this case, signals flowing through the branch line 5-4 are the branch signal 22-4 and the reflected signal 24-4c.

The reflected signal 24-4c is delayed from the branch signal 22-4 by the amount of time for flowing through the partial line 3-5 twice. Original signals of the reflected signal 24-4c are the reflected signal 24-4 and the reflected signal 24-4b, and the reflected signal 24-4 flows through the partial line 3-5 once, and the reflected signal 24-4b flows through the partial line 3-5 once. Thus, the reflected signal 24-4c flows through the partial line 3-5 twice.

In addition, the reflected signal 24-4c is a signal having an opposite polarity from the main signal 21 due to the reflection of the original signal at the connection point 8-4, but the original signal is also reflected at the connection point 8-3 thereafter, so that the reflected signal 24-4c is a signal having the same polarity as the main signal 21.

Since the reflected signal 24-4c is delayed from the branch signal 22-4, the reflected signal 24-4c is a factor of causing a waveform distortion or a waveform breaking of the branch signal 22-4.

In the bus system illustrated in FIG. 4, since the signal compensation line 14 is connected to the main line 3, the reflected signal 24-5a flows through the branch line 5-4.

The reflected signal 24-5a is delayed from the branch signal 22-4 by the amount of time for flowing through the partial line 3-6 twice. Original signals of the reflected signal 24-5a are the main signal 21 and the reflected signal 24-5, and the main signal 21 flows through the partial line 3-6 once, and the reflected signal 24-5 flows through the partial line 3-6 once. Thus, the reflected signal 24-5a flows through the partial line 3-6 twice.

However, since the line length of the partial line 3-6 is the same as the line length of the partial line 3-5, the amount of delay of the reflected signal 24-5a with respect to the branch signal 22-4 is the same as the amount of delay of the reflected signal 24-4c with respect to the branch signal 22-4.

In addition, the reflected signal 24-5a is a signal having an opposite polarity from the main signal 21 due to the reflection at the connection point 16.

In addition, the reflected signal 24-5a is a signal having an opposite polarity from the reflected signal 24-4c.

Since the reflected signal 24-5a and the reflected signal 24-4c are signals having opposite polarities from each other, the signals cancel each other out, and a signal reaching the third communication device 7-4 is substantially only the branch signal 22-4.

As described above, in the bus system illustrated in FIG. 4, the influence of the reflected signal 24-4c on the branch signal 22-4 is reduced.

Here, the bus system is illustrated in which the line length of the partial line 3-5 and the line length of the partial line 3-6 are the same length.

The bus system is not limited to this, and for example, the respective line lengths of the partial lines 3-3 to 3-6 may be the same length.

If the respective line lengths of the partial lines 3-3 to 3-6 are the same length, a signal reaching the third communication device 7-3 is also substantially only the branch signal 22-3. In addition, also a signal reaching the third communication device 7-2 is substantially only a branch signal passing through the branch line 5-2.

In the third embodiment described above, the bus system includes the signal compensation line 14 including the first end connected to the main line 3 on a side closer to the terminating resistor 13 with respect to the first connection point 8-4 counted from the terminating resistor 13 among the connection points 8-1 to 8-4 between the main line 3 and the respective first ends of the branch lines 5-1 to 5-4, and the second end grounded. Thus, the bus system can reduce the influence of the reflected wave on the branch signal.

The bus systems of the first and second embodiments are examples in which the signal compensation line 9 is included, and the bus system of the third embodiment is an example in which the signal compensation line 14 is included.

Figure 6:
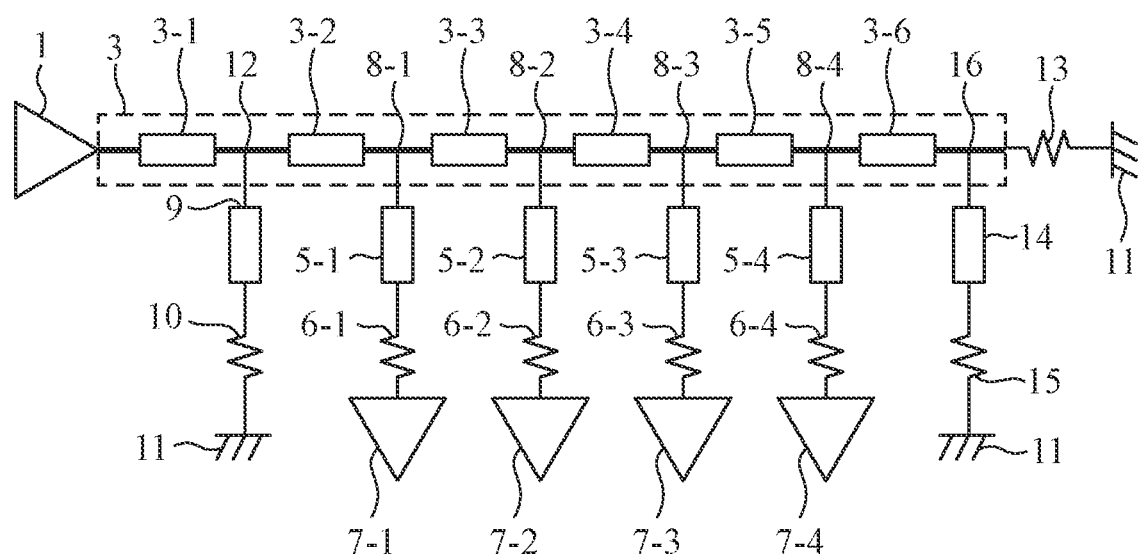
FIG. 6 is a configuration diagram illustrating another bus system according to the third embodiment.

However, the bus system is not limited to this, and may include both the signal compensation line 9 and the signal compensation line 14, as illustrated in FIG. 6.

FIG. 6 is a configuration diagram illustrating another bus system according to the third embodiment.

If the respective line lengths of the partial lines 3-2 to 3-6 are the same length, a signal reaching each of the third communication devices 7-1 to 7-4 is substantially only a branch signal passing through each of branch lines 5-1 to 5-4.

Fourth Embodiment

The bus system of the first embodiment is an example in which the first end of the main line 3 is connected to the first communication device 1, and the second end of the main line 3 is connected to the second communication device 2 via the terminating resistor 4.

A bus system in which the first end of the main line 3 is grounded via a terminating resistor 17, and the second end of the main line 3 is grounded via the terminating resistor 13, will be described in a fourth embodiment.

Figure 7:
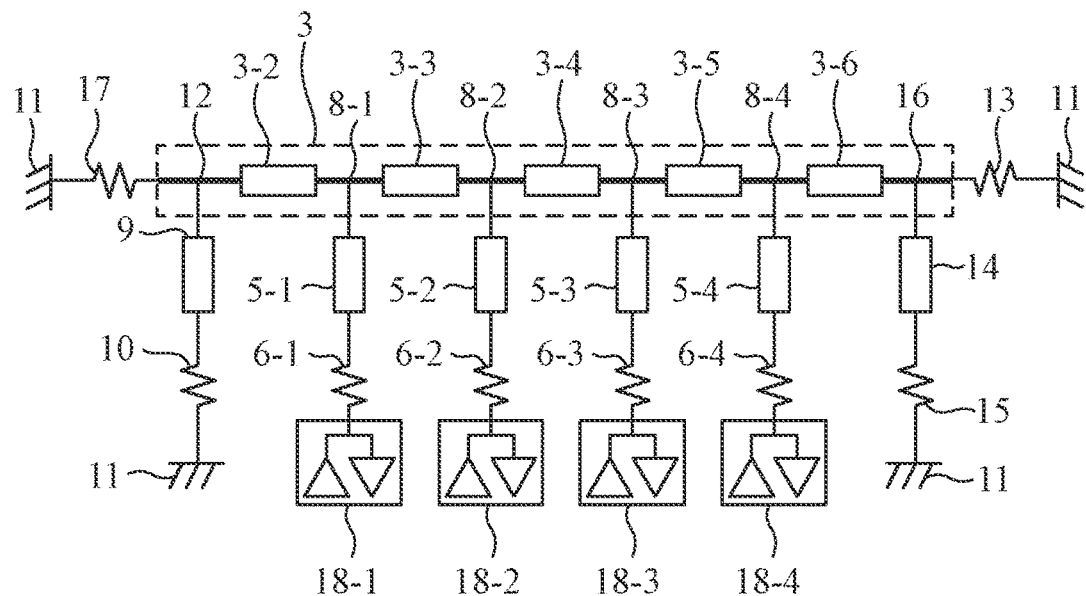
FIG. 7 is a configuration diagram illustrating a bus system according to a fourth embodiment.

FIG. 7 is a configuration diagram illustrating the bus system according to the fourth embodiment. In FIG. 7, since the same reference numerals as those in FIGS. 1, 3, 4, and 6 denote the same or corresponding portions, the description thereof will be omitted.

The terminating resistor 17 includes a first end connected to the first end of the main line 3, and a second end connected to the ground 11.

Each of third communication devices 18-1 to 18-4 is a communication device that can operate as a transceiver.

Any one of the third communication devices 18-1 to 18-4 operates as a transmitter, and the rest of the third communication devices operate as receivers.

Next, operation of the bus system illustrated in FIG. 7 will be described.

In the bus system illustrated in FIG. 7, for example, it is assumed that any one of the third communication devices 18-1 to 18-3 operates as a transmitter, and the rest of the third communication devices operate as receivers. In addition, it is assumed that the third communication device 18-4 operates as a receiver.

In addition, in the bus system illustrated in FIG. 7, it is assumed that the line length of the partial line 3-5 and the line length of the partial line 3-6 are the same length.

Since the bus system illustrated in FIG. 7 includes the signal compensation line 14, a signal reaching the third communication device 18-4 is substantially only a branch signal passing through the branch line 5-4 in accordance with the same principle as that of the bus systems illustrated in FIGS. 4 and 6.

Next, in the bus system illustrated in FIG. 7, it is assumed that for example, any one of the third communication devices 18-2 to 18-4 operates as a transmitter, and the rest of the third communication devices operate as receivers. In addition, it is assumed that the third communication device 18-1 operates as a receiver.

In addition, in the bus system illustrated in FIG. 7, it is assumed that the line length of the partial line 3-2 and the line length of the partial line 3-3 are the same length.

Since the bus system illustrated in FIG. 7 includes the signal compensation line 9, a signal reaching the third communication device 18-1 is substantially only a branch signal passing through the branch line 5-1 in accordance with the same principle as that of the bus systems illustrated in FIGS. 1, 3, and 6.

In the bus system illustrated in FIG. 7, the respective line lengths of the partial lines 3-2 to 3-6 may be the same length.

If the respective line lengths of the partial lines 3-2 to 3-6 are the same length, also a signal reaching any one of the third communication devices 18-1 to 18-4 operating as a receiver is substantially only a branch signal passing through each of the branch lines.

In the fourth embodiment described above, the bus system includes any one of the third communication devices 18-1 to 18-4 that is a transmitter, and the rest of the third communication devices that are receivers. Also in the bus system of the fourth embodiment, similarly to the bus systems of the first to third embodiments, the influence of the reflected wave on the branch signal can be reduced.

Fifth Embodiment

The bus systems of the first to fourth embodiments are examples in which the main line 3 is a single line.

In a fifth embodiment, a bus system will be described including a main line bifurcated on the way.

Figure 8:
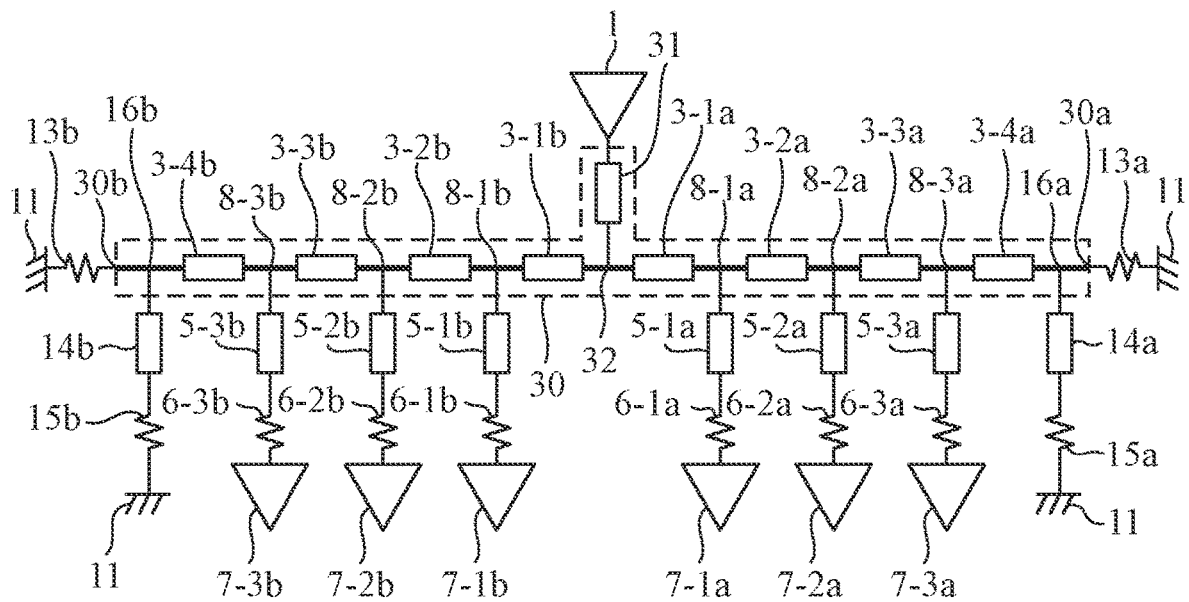
FIG. 8 is a configuration diagram illustrating a bus system according to a fifth embodiment.

FIG. 8 is a configuration diagram illustrating the bus system according to the fifth embodiment. In FIG. 8, since the same reference numerals as those in FIGS. 1, 3, 4, 6, and 7 denote the same or corresponding portions, the description thereof will be omitted.

A main line 30 includes a first end connected to the first communication device 1, and is bifurcated on the way.

A first branch end 30a of the main line 30 is connected to the ground 11 via a terminating resistor 13a.

A second branch end 30b of the main line 30 is connected to the ground 11 via a terminating resistor 13b.

The main line 30 includes a partial line 31, partial lines 3-1a to 3-4a, and partial lines 3-1b to 3-4b.

The partial line 31 includes a first end connected to the first communication device 1, and a second end connected to a branch point 32 of the main line 30.

Each of the partial lines 3-1a to 3-4a is a line corresponding to each of the partial lines 3-1 to 3-4 illustrated in FIG. 1.

The partial lines 3-1a to 3-4a are connected between the branch point 32 of the main line 30 and the terminating resistor 13a.

Each of the partial lines 3-1b to 3-4b is a line corresponding to each of the partial lines 3-1 to 3-4 illustrated in FIG. 1.

The partial lines 3-1b to 3-4b are connected between the branch point 32 of the main line 30 and the terminating resistor 13b.

For convenience of explanation, FIG. 8 illustrates a part of the main line 30 including the partial lines 3-1a to 3-4a and the partial lines 3-1b to 3-4b connected together in series; however, the line of a portion from the branch end 30a to the branch end 30b is actually a single line.

In the bus system illustrated in FIG. 8, the line length of the partial line 3-3a and the line length of the partial line 3-4a are the same length.

In addition, in the bus system illustrated in FIG. 8, the line length of the partial line 3-3b and the line length of the partial line 3-4b are the same length.

Each of branch lines 5-1a to 5-3a is a line corresponding to each of the branch lines 5-1 to 5-3 illustrated in FIG. 1.

Each of branch lines 5-1b to 5-3b is a line corresponding to each of the branch lines 5-1 to 5-3 illustrated in FIG. 1.

Each of terminating resistors 6-1*a* to 6-3*a* is a resistor corresponding to each of the terminating resistors 6-1 to 6-3 illustrated in FIG. 1.

Each of terminating resistors 6-1*b* to 6-3*b* is a resistor corresponding to each of the terminating resistors 6-1 to 6-3 illustrated in FIG. 1.

Each of second communication devices 7-1*a* to 7-3*a* is a communication device corresponding to each of the third communication devices 7-1 to 7-3 illustrated in FIG. 1.

Each of second communication devices 7-1*b* to 7-3*b* is a communication device corresponding to each of the third communication devices 7-1 to 7-3 illustrated in FIG. 1.

Each of connection points 8-1*a* to 8-3*a* is a point where each of first ends of the branch lines 5-1*a* to 5-3*a* is connected to the main line 30.

Each of connection points 8-1*b* to 8-3*b* is a point where each of first ends of the branch lines 5-1*b* to 5-3*b* is connected to the main line 30.

The terminating resistor 13*a* includes a first end connected to the branch end 30*a* of the main line 30, and a second end connected to the ground 11.

The terminating resistor 13*b* includes a first end connected to the branch end 30*b* of the main line 30, and a second end connected to the ground 11.

A first signal compensation line 14*a* includes a first end connected to the main line 30 on the terminating resistor 13*a* side from the connection point 8-3*a* in the main line 30, and a second end grounded via a terminating resistor 15*a*.

The terminating resistor 15*a* is a resistor connected between the second end of the first signal compensation line 14*a* and the ground 11.

The terminating resistor 15*a* is matched with the first signal compensation line 14*a*.

Since the terminating resistor 15*a* is matched with the signal compensation line 14*a*, it is possible to suppress reflection of a signal reaching the ground 11 through the signal compensation line 14*a*.

A connection point 16*a* is a point where the first end of the first signal compensation line 14*a* is connected to the main line 30.

A second signal compensation line 14*b* includes a first end connected to the main line 30 on the terminating resistor 13*b* side from the connection point 8-3*b* in the main line 30, and a second end grounded via a terminating resistor 15*b*.

The terminating resistor 15*b* is a resistor connected between the second end of the second signal compensation line 14*b* and the ground 11.

The terminating resistor 15*b* is matched with the second signal compensation line 14*b*.

Since the terminating resistor 15*b* is matched with the signal compensation line 14*b*, it is possible to suppress reflection of a signal reaching the ground 11 through the signal compensation line 14*b*.

A connection point 16*b* is a point where the first end of the second signal compensation line 14*b* is connected to the main line 30.

Next, operation of the bus system illustrated in FIG. 8 will be described.

Figure 9:
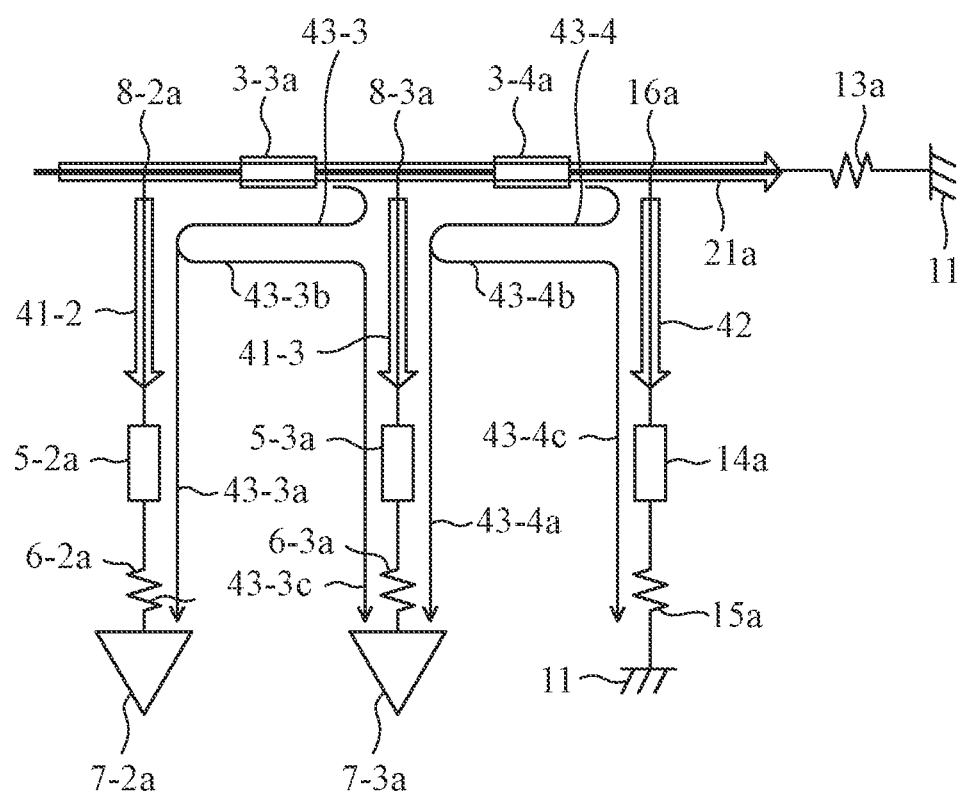
FIG. 9 is an explanatory diagram illustrating a flow of a signal output from the first communication device 1.

FIG. 9 is an explanatory diagram illustrating a flow of the signal output from the first communication device 1.

The main signal output from the first communication device 1 is bifurcated at the branch point 32.

One main signal 21*a* of bifurcated signals is transmitted by the partial lines 3-1*a*, 3-2*a*, 3-3*a*, and 3-4*a*.

Another main signal of the bifurcated signals is transmitted by the partial lines 3-1*b*, 3-2*b*, 3-3*b*, and 3-4*b*.

Since each of the branch lines 5-1*a* to 5-3*a* and the first signal compensation line 14*a* is connected to the main line 30, the main signal 21*a* is divided. Branch signals, which are divided signals, flow through the respective branch lines 5-1*a* to 5-3*a* and first signal compensation line 14*a*.

In FIG. 9, the branch signal flowing through the branch line 5-2*a* is represented by reference numeral 41-2, and the branch signal flowing through the branch line 5-3*a* is represented by reference numeral 41-3.

In addition, the branch signal flowing through the first signal compensation line 14*a* is represented by reference numeral 42.

The branch signal 41-2 reaches the second communication device 7-2*a* through the branch line 5-2*a*, and is received by the second communication device 7-2*a*.

The branch signal 41-3 reaches the second communication device 7-3*a* through the branch line 5-3*a*, and is received by the second communication device 7-3*a*.

Since a mismatch of the characteristic impedance of the line occurs at each of the connection points 8-1*a* to 8-3*a*, a part of the main signal 21*a* is reflected at each of the connection points 8-1*a* to 8-3*a*.

For example, a reflected signal 43-3, which is a signal reflected at the connection point 8-3*a*, flows through the partial line 3-3*a* as illustrated in FIG. 9.

When reaching the connection point 8-2*a*, the reflected signal 43-3 is reflected at the connection point 8-2*a*.

A part of the reflected signal 43-3 flows through the branch line 5-2*a* as a reflected signal 43-3*a* as illustrated in FIG. 9.

The rest of the reflected signal 43-3 flows through the partial line 3-3*a* as a reflected signal 43-3*b*.

When reaching the connection point 8-3*a*, the reflected signal 43-3*b* is reflected at the connection point 8-3*a*.

Apart of the reflected signal 43-3*b* flows through the branch line 5-3*a* as a reflected signal 43-3*c* as illustrated in FIG. 9.

A reflected signal 43-4, which is a signal reflected at the connection point 16*a*, flows through the partial line 3-4*a* as illustrated in FIG. 9.

When reaching the connection point 8-3*a*, the reflected signal 43-4 is reflected at the connection point 8-3*a*.

A part of the reflected signal 43-4 flows through the branch line 5-3*a* as a reflected signal 43-4*a* as illustrated in FIG. 9.

The rest of the reflected signal 43-4 flows through the partial line 3-4*a* as a reflected signal 43-4*b*.

When reaching the connection point 16*a*, the reflected signal 43-4*b* is reflected at the connection point 16*a*.

A part of the reflected signal 43-4*b* flows through the first signal compensation line 14*a* as a reflected signal 43-4*c* as illustrated in FIG. 9.

In the bus system illustrated in FIG. 9, if the first signal compensation line 14*a* is not connected to the main line 30, the reflected signal 43-4*a* does not flow through the branch line 5-3*a*.

Thus, in this case, signals flowing through the branch line 5-3*a* are the branch signal 41-3 and the reflected signal 43-3*c*.

The reflected signal 43-3*c* is delayed from the branch signal 41-3 by the amount of time for flowing through the partial line 3-3*a* twice. Original signals of the reflected signal 43-3*c* are the reflected signal 43-3 and the reflected signal 43-3*b*, and the reflected signal 43-3 flows through the partial line 3-3*a* once, and the reflected signal 43-3*b* flows through the partial line 3-3*a* once. Thus, the reflected signal 43-3*c* flows through the partial line 3-3*a* twice.

In addition, the reflected signal 43-3c is a signal having an opposite polarity from the main signal 21a due to the reflection of the original signal at the connection point 8-3a but the original signal is also reflected at the connection point 8-2a, so that the reflected signal 43-3c is a signal having the same polarity as the main signal 21a.

Since the reflected signal 43-3c is delayed from the branch signal 41-3, the reflected signal 43-3c is a factor of causing a waveform distortion or a waveform breaking of the branch signal 41-3.

In the bus system illustrated in FIG. 8, since the first signal compensation line 14a is connected to the main line 30, the reflected signal 43-4a flows through the branch line 5-3a.

The reflected signal 43-4a is delayed from the branch signal 41-3 by the amount of time for flowing through the partial line 3-4a twice. Original signals of the reflected signal 43-4a are the main signal 21a and the reflected signal 43-4, and the main signal 21a flows through the partial line 3-4a once, and the reflected signal 43-4 flows through the partial line 3-4a once. Thus, the reflected signal 43-4a flows through the partial line 3-4a twice.

However, since the line length of the partial line 3-4a is the same as the line length of the partial line 3-3a, the amount of delay of the reflected signal 43-4a with respect to the branch signal 41-3 is the same as the amount of delay of the reflected signal 43-3c with respect to the branch signal 41-3.

In addition, the reflected signal 43-4a is a signal having an opposite polarity from the main signal 21a due to the reflection of the original signal at the connection point 16a.

In addition, the reflected signal 43-4a is a signal having an opposite polarity from the reflected signal 43-3c.

Since the reflected signal 43-4a and the reflected signal 43-3c are signals having opposite polarities from each other, the signals cancel each other out, and a signal reaching the second communication device 7-3a is substantially only the branch signal 41-3.

As described above, in the bus system illustrated in FIG. 8, the influence of the reflected signal 43-3c on the branch signal 41-3 is reduced.

Here, the bus system is illustrated in which the line length of the partial line 3-3a and the line length of the partial line 3-4a are the same length.

The bus system is not limited to this, and for example, the respective line lengths of the partial lines 3-1a to 3-4a may be the same length.

If the respective line lengths of the partial lines 3-1a to 3-4a are the same length, also a signal reaching the second communication device 7-2a is substantially only the branch signal 41-2. In addition, also a signal reaching the second communication device 7-1a is substantially only a branch signal passing through the branch line 5-1a.

In the bus system illustrated in FIG. 8, a signal compensation line is not connected to a first end of the partial line 3-1a, but the first end of the partial line 3-1a is connected to the branch point 32. Thus, since a signal reflected at the branch point 32 flows through the branch line 5-1a via the partial line 3-1a, similarly to a case where the signal compensation line is connected to the first end of the partial line 3-1a, two reflected signals flowing through the branch line 5-1a cancel out.

In the bus system illustrated in FIG. 8, the line length of the partial line 3-3b and the line length of the partial line 3-4b are the same length.

Thus, a signal reaching the second communication device 7-3b is substantially only a branch signal passing through the branch line 5-3b in accordance with the same principle as that of the signal reaching the second communication device 7-3a.

In the bus system illustrated in FIG. 8, the respective line lengths of the partial lines 3-1b to 3-4b may be the same length.

If the respective line lengths of the partial lines 3-1b to 3-4b are the same length, also a signal reaching the second communication device 7-2b is substantially only a branch signal passing through the branch line 5-2b. In addition, also a signal reaching the second communication device 7-1b is substantially only a branch signal passing through the branch line 5-1b.

In the bus system illustrated in FIG. 8, a signal compensation line is not connected to a first end of the partial line 3-1b, but the first end of the partial line 3-1b is connected to the branch point 32. Thus, since a signal reflected at the branch point 32 flows through the branch line 5-1b via the partial line 3-1b, similarly to a case where the signal compensation line is connected to the first end of the partial line 3-1b, two reflected signals flowing through the branch line 5-1b cancel out.

As described above, also in the bus system including the main line 30 bifurcated on the way, similarly to the bus systems of the first to fourth embodiments, the influence of the reflected wave on the branch signal can be reduced.

Sixth Embodiment

In a sixth embodiment, a communication apparatus will be described including any of the bus systems described in the first to fifth embodiments.

Figure 10:
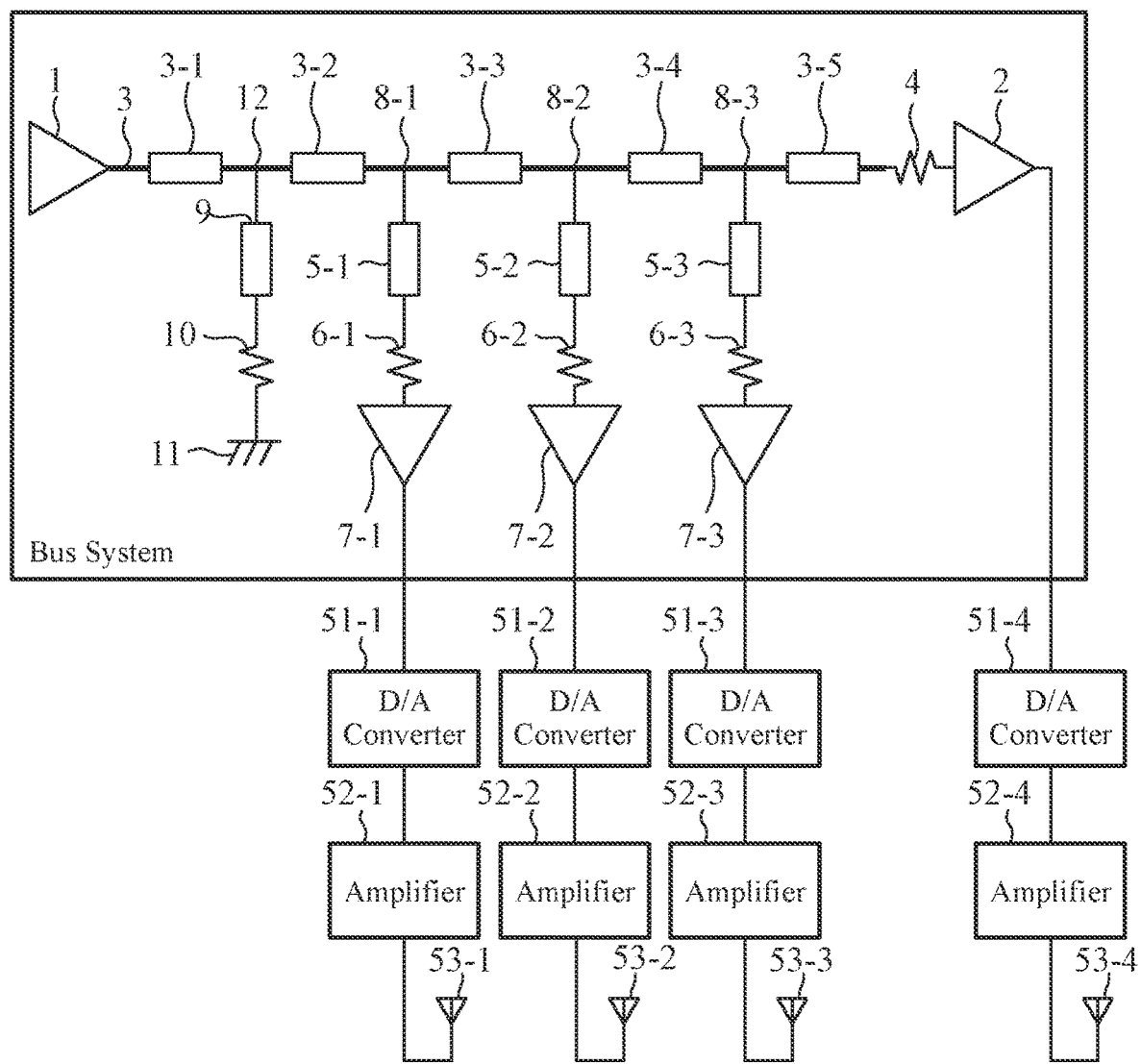
FIG. 10 is a configuration diagram illustrating a communication apparatus according to a sixth embodiment.

FIG. 10 is a configuration diagram illustrating a communication apparatus according to the sixth embodiment. In FIG. 10, since the same reference numerals as those in FIG. 1 denote the same or corresponding portions, the description thereof will be omitted.

In the communication apparatus illustrated in FIG. 10, the bus system illustrated in FIG. 1 is adopted; however, the bus system illustrated in any of FIGS. 3, 4, and 6 to 8 may be applied.

D/A converters 51-1 to 51-3, which are digital/analog converters, convert branch signals respectively output from the third communication devices 7-1 to 7-3 from digital signals to analog signals.

The D/A converters 51-1 to 51-3 output the respective analog branch signals to amplifiers 52-1 to 52-3.

A D/A converter 51-4 converts a main signal output from the second communication device 2 from a digital signal to an analog signal.

The D/A converter 51-4 outputs the analog main signal to an amplifier 52-4.

The amplifiers 52-1 to 52-3 amplify the branch signals respectively output from the D/A converters 51-1 to 51-3, and output the respective amplified branch signals to antennas 53-1 to 53-3.

The amplifier 52-4 amplifies the main signal output from the D/A converter 51-4, and outputs the amplified main signal to an antenna 53-4.

The antennas 53-1 to 53-3 radiate the branch signals respectively output from the amplifiers 52-1 to 52-3 into space.

The antenna 53-4 radiates the branch signal output from the amplifier 52-4 into space.

Next, operation of the communication apparatus illustrated in FIG. 10 will be described.

When the respective branch signals of the main signal output from the first communication device 1 arrives, the third communication devices 7-1 to 7-3 output the respective branch signals to the D/A converters 51-1 to 51-3.

When the main signal output from the first communication device 1 arrives, the second communication device 2 outputs the main signal to the D/A converter 51-4.

When receiving the branch signals from the respective third communication devices 7-1 to 7-3, the D/A converters 51-1 to 51-3 convert the respective branch signals from digital signals to analog signals.

The D/A converters 51-1 to 51-3 output the respective analog branch signals to the amplifiers 52-1 to 52-3.

When receiving the main signal from the second communication device 2, the D/A converter 51-4 converts the main signal from a digital signal to an analog signal.

The D/A converter 51-4 outputs the analog main signal to the amplifier 52-4.

When receiving the branch signals from the respective D/A converters 51-1 to 51-3, the amplifiers 52-1 to 52-3 amplify the respective branch signals, and output the respective amplified branch signals to the antennas 53-1 to 53-3.

When receiving the main signal from the D/A converter 51-4, the amplifier 52-4 amplifies the main signal, and outputs the amplified main signal to the antenna 53-4.

The antennas 53-1 to 53-3 radiate the branch signals respectively output from the amplifiers 52-1 to 52-3 into space.

The antenna 53-4 radiates the branch signal output from the amplifier 52-4 into space.

In this example described above, the communication apparatus operates as a signal transmission apparatus. However, this is not a limitation, and the communication apparatus may operate as a signal reception apparatus.

When the communication apparatus operates as a signal reception apparatus, each of the second communication device 2 and the third communication devices 7-1 to 7-3 operates as a transmitter, and the first communication device 1 operates as a receiver.

Note that, in the invention of the present application, within the scope of the invention, free combination of embodiments, a modification of an arbitrary component of each embodiment, or omission of an arbitrary component in each embodiment is possible.

INDUSTRIAL APPLICABILITY

The present invention is suitable for a bus system including a main line and a plurality of branch lines.

In addition, the present invention is suitable for a communication apparatus including the bus system.

REFERENCE SIGNS LIST

1: first communication device,
2: second communication device,
3: main line,
3-1 to 3-6: partial line,
3-1*a* to 3-4*a*, 3-1*b* to 3-4*b*: partial line,
4: terminating resistor,
5-1 to 5-4: branch line,
5-1*a* to 5-3*a*, 5-1*b* to 5-3*b*: branch line,
6-1 to 6-4: terminating resistor,
6-1*a* to 6-3*a*, 6-1*b* to 6-3*b*: terminating resistor,
7-1 to 7-4: third communication device,
7-1*a* to 7-3*a*, 7-1*b* to 7-3*b*: second communication device,
8-1 to 8-4: connection point,
8-1*a* to 8-3*a*, 8-1*b* to 8-3*b*: connection point,
9: signal compensation line (first signal compensation line),
10: terminating resistor,
11: ground,
12: connection point,
13, 13*a*, and 13*b*: terminating resistor,
14: signal compensation line (second signal compensation line),
14*a*: first signal compensation line,
14*b*: second signal compensation line,
15, 15*a*, and 15*b*: terminating resistor,
16, 16*a*, and 16*b*: connection point,
17: terminating resistor,
18-1 to 18-4: third communication device,
21, 21*a*: main signal,
22-1, 22-1, 22-3, 22-4, and 23: branch signal,
24-1, 24-1*a*, 24-1*b*, and 24-1*c*: reflected signal,
24-2, 24-2*a*, 24-2*b*, and 24-2*c*: reflected signal,
24-4, 24-4*a*, 24-4*b*, and 24-4*c*: reflected signal,
24-5, 24-5*a*, 24-5*b*, and 24-5*c*: reflected signal,
25: branch signal,
30: main line,
30*a*: first branch end,
30*b*: second branch end,
31: partial line,
32: branch point,
41-2, 41-3, and 42: branch signal,
43-3, 43-3*a*, 43-3*b*, and 43-3*c*: reflected signal,
43-4, 43-4*a*, 43-4*b*, and 43-4*c*: reflected signal,
51-1 to 51-4: D/A converter,
52-1 to 52-4: amplifier, and
53-1 to 53-4: antenna.

The invention claimed is:

1. A bus system comprising:
a main line that includes a first line extending between a first end, connected to a first communication device, and a branch point, a second line extending between the branch point and a first terminated end, and a third line extending between the branch point and a second terminated end;
a plurality of branch lines each including a first end connected to either of the second line and the third line between the first terminated end and the second terminated end, and a second end connected to any one of a plurality of second communication devices;
a first signal compensation line including a first end connected to the second line at a position closer to the first terminated end compared to a first connection point where the first end of a branch line closest to the first terminated end is connected to the second line, and a second end grounded; and
a second signal compensation line including a first end connected to the third line at a position closer to the second terminated end compared to a first connection point where the first end of a branch line closest to the second terminated end is connected to the third line, and a second end grounded.

2. The bus system according to claim 1, wherein
a line length of the second line between a first connection point where the first end of the branch line closest to the first terminal end is connected to the second line and the position where the first end of the first signal compensation line is connected to the second line, and
a line length of the second line between the first connection point and a second connection point where another branch line second closest to the first terminated end is connected to the second line are equal, and a line length of the third line between a third connection point where the first end of the branch line closest to the second terminal end is connected to the third line and the position where the first end of the second signal compensation line is connected to the third line, and a line length of the third line between the third connection point and a fourth connection point where another branch line second closest to the second terminal end is connected to the third line are equal.

3. The bus system according to claim 2, wherein
respective line lengths between adjacent connection points of where the plurality of branch lines is connected to the second line are equal to a length of the second line between the position where the first end of the first signal compensation line is connected to the second line and the first connection point, and a line length of the third line between the connection point where the first end of the second compensation line is connected to the third line and the third connection port closest to the second terminated end are equal.

4. The bus system according to claim 1, wherein
the first signal compensation line and the second signal compensation line each include the second end grounded via a terminating resistor, and an impedance of the terminating resistor connected to the first signal compensation line is matched with the first signal compensation line, and an impedance of the terminating resistor connected to the second signal compensation line is matched with the second signal compensation line.

5. A communication apparatus comp sing a bus system, wherein the bus system according to claim 1.

\* \* \* \* \*